(12) United States Patent
Wang

(10) Patent No.: US 9,534,628 B1
(45) Date of Patent: Jan. 3, 2017

(54) FOLDING DEVICE FOR BABY CARRIAGE

(71) Applicant: Kun Wang, Taichung (TW)

(72) Inventor: Kun Wang, Taichung (TW)

(*) Notice: Subject to any disclaimer, the term of this patent is extended or adjusted under 35 U.S.C. 154(b) by 0 days.

(21) Appl. No.: 15/155,555

(22) Filed: May 16, 2016

(51) Int. Cl.
| | | |
|---|---|---|
| *E05D 11/10* | (2006.01) | |
| *A45F 5/10* | (2006.01) | |
| *B62B 7/00* | (2006.01) | |
| *F16C 11/10* | (2006.01) | |
| *B62B 9/12* | (2006.01) | |

(52) U.S. Cl.
CPC ...... *F16C 11/10* (2013.01); *B62B 9/12* (2013.01)

(58) Field of Classification Search
CPC ............ B62B 5/06; B62B 5/061; B62B 5/064; B62B 5/066; B62B 5/067; B62B 9/12; B62B 9/20; B62B 9/203; B62B 3/02; B62B 3/022; B62B 3/027; B62B 2205/20; A45C 13/262; Y10T 16/469; Y10T 16/473; Y10T 16/498; Y10T 16/429; Y10T 16/427; Y10T 16/54024; Y10T 16/540243; Y10T 16/540247; Y10T 16/54025; Y10T 16/54028

See application file for complete search history.

(56) References Cited

U.S. PATENT DOCUMENTS

| | | | | | |
|---|---|---|---|---|---|
| 4,614,452 A | * | 9/1986 | Wang | ............ | F16B 7/04 403/146 |
| 5,039,118 A | * | 8/1991 | Huang | ............ | B62B 9/20 280/47.371 |
| 5,056,805 A | * | 10/1991 | Wang | ............ | B62B 9/20 280/47.36 |
| 5,062,179 A | * | 11/1991 | Huang | ............ | B62B 9/20 16/436 |
| 5,123,768 A | * | 6/1992 | Franklin | ............ | A46B 5/0075 403/84 |
| 5,168,601 A | * | 12/1992 | Liu | ............ | B62B 9/20 16/329 |
| 5,377,368 A | * | 1/1995 | Cheng | ............ | A47D 13/063 16/329 |
| 5,535,483 A | * | 7/1996 | Jane Cabagnero | ....... | B62B 9/20 16/429 |
| 5,765,958 A | * | 6/1998 | Lan | ............ | B62B 7/06 403/84 |
| 5,887,935 A | * | 3/1999 | Sack | ............ | B62B 7/008 280/47.38 |
| 5,961,180 A | * | 10/1999 | Greger | ............ | A47D 13/025 297/183.2 |
| 6,322,098 B1 | * | 11/2001 | Lan | ............ | B62B 7/08 280/42 |

(Continued)

*Primary Examiner* — Chuck Mah
(74) *Attorney, Agent, or Firm* — Ming Chow; Sinorica, LLC

(57) ABSTRACT

A folding device for a baby carriage has an operating arm, a first cover, an engaging unit, an elastic unit, a first abutting unit, a second abutting unit, and a second cover. The operating arm has two opposite ends. The first cover is connected to one of the two opposite ends of the operating arm. The first cover and the second cover are pivotally mounted with each other. The engaging unit, the elastic unit, the first abutting unit, and the second abutting unit are received in the first cover and the second cover. The folding device for a baby carriage not only avoids dust or foreign objects accumulating on the inner structures received inside the first cover and the second cover, but also prevents fingers from accidentally pinching.

12 Claims, 10 Drawing Sheets

(56) References Cited

U.S. PATENT DOCUMENTS

| | | | | |
|---|---|---|---|---|
| 6,550,801 B1* | 4/2003 | Newhard | ................ | B62B 7/06 |
| | | | | 280/47.371 |
| 6,565,111 B2* | 5/2003 | Ageneau | ................ | B62B 9/20 |
| | | | | 280/647 |
| 6,948,197 B1* | 9/2005 | Chen | ................ | A47D 5/006 |
| | | | | 403/97 |
| 7,631,575 B2* | 12/2009 | Gard | ................ | F16C 11/10 |
| | | | | 74/530 |
| 8,132,978 B2* | 3/2012 | Franklin | ................ | B05C 17/022 |
| | | | | 16/324 |
| 8,925,153 B1* | 1/2015 | McGrath | ................ | E05D 11/1007 |
| | | | | 16/326 |
| 2004/0179891 A1* | 9/2004 | Watkins | ................ | F16C 11/10 |
| | | | | 403/96 |

* cited by examiner

FOLDING DEVICE FOR BABY CARRIAGE

BACKGROUND OF THE INVENTION

1. Field of the Invention

The present invention relates to a folding device, and more particularly to a folding device applied to a baby carriage that can prevent fingers from being pinched.

2. Description of Related Art

A baby carriage adopts many folding devices to make the baby carriage foldable and to enable the baby carriage to be easily carried and stored. With reference to FIG. 9, a conventional baby carriage has a main frame 70 and a seat 80. The main frame 70 has a supporting pole 71 and a handle 72 pivotally assembled on the supporting pole 71. The seat 80 is assembled on the handle 72. With reference to FIG. 10, the handle 72 is foldable to minimize the storage space of the baby carriage. A gap 90 is formed between the supporting pole 71 and the handle 72 when the handle 72 is folded, and the gap 90 exposes an inner structure between the supporting pole 71 and the handle 72. The exposed inner structure not only easily accumulates dust and foreign objects, making the handle 72 hard to be folded, but also raises the risk of pinching fingers.

To overcome the shortcomings of the conventional baby carriage, the present invention provides a folding device for a baby carriage to mitigate or obviate the aforementioned problems.

SUMMARY OF THE INVENTION

The main objective of the present invention is to provide a folding device for a baby carriage that can prevent fingers from being accidentally pinched.

The folding device comprises an operating arm, a first cover, an engaging unit, an elastic unit, a first abutting unit, a second abutting unit, and a second cover. The operating arm has two opposite ends. The first cover is connected to one of the two opposite ends of the operating arm. The first cover and the second cover are pivotally mounted with each other. The engaging unit, the elastic unit, the first abutting unit, and the second abutting unit are received in the first cover and the second cover. The folding device for a baby carriage not only avoids dust or foreign objects accumulating on the inner structures received inside the first cover and the second cover, but also prevents fingers from accidentally pinching.

Other objects, advantages, and novel features of the invention will become more apparent from the following detailed description when taken in conjunction with the accompanying drawings.

DETAILED DESCRIPTION OF PREFERRED EMBODIMENT

Figure 1:
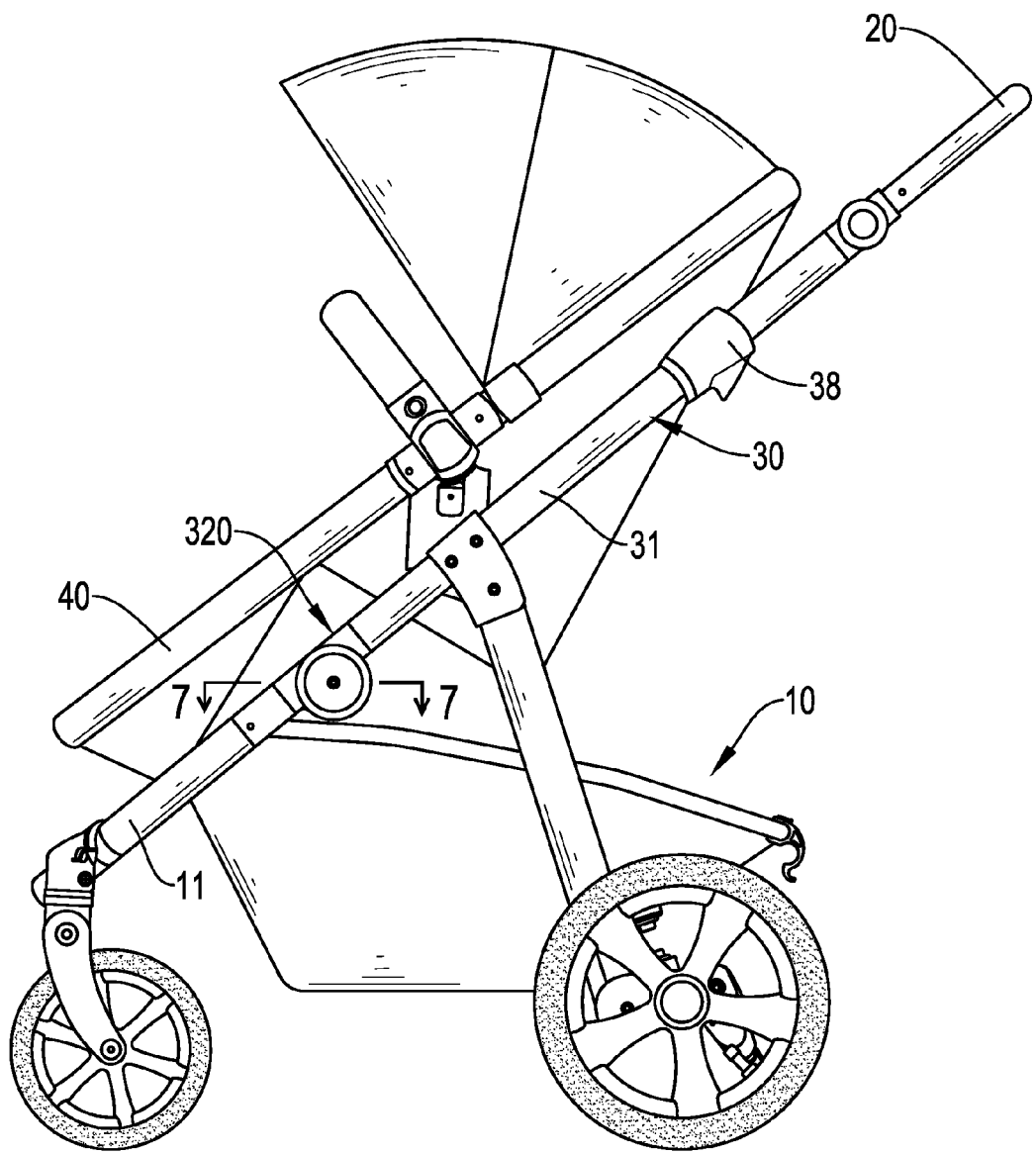
FIG. 1 is a side view of a baby carriage with a folding device in accordance with the present invention.

With reference to FIG. 1, a baby carriage adopts the folding device in accordance with the present invention and comprises a base 10, a handle 20, two folding devices 30, and a seat 40. The base 10 has two opposite sides. The handle 20 is assembled on the two folding devices 30. The two folding devices 30 are respectively assembled on the two opposite sides of the base 10. The seat 40 is assembled between the two folding devices 30.

With reference to FIG. 1, the base 10 has a connecting unit 11. The connecting unit 11 has two opposite ends respectively extending to the two opposite sides of the base 10. The handle 20 is assembled on the two folding devices 30.

With reference to FIGS. 1 to 4, each folding device 30 has an operating arm 31, a first cover 32, an engaging unit 33, an elastic unit 34, a first abutting unit 35, a second abutting unit 36, a second cover 37, an operating sleeve 38, and a controlling cable 39. The operating arm 31 is a hollow tube and has two opposite ends. The first cover 32 is connected to one of the two opposite ends of the operating arm 31. The first cover 32 has a connecting portion 320, a first plate 321, a first surrounding wall 322, a first engaging portion 323, and a positioning pole 324. The connecting portion 320 has two opposite ends and a through hole 3201. One of the two opposite ends of the connecting portion 320 is connected to the operating arm 31. The through hole 3201 is formed in the other end of the connecting portion 320. The first plate 321 has a central portion and a rim. The first surrounding wall 322 is connected to the rim of the first plate 321 and has an inner surface. The first engaging portion 323 is formed on the inner surface of the first surrounding wall 322 and has multiple protrusions. The multiple protrusions of the first engaging portion 323 are arranged at angular intervals. The positioning pole 324 is connected to the central portion of the first plate 321.

Figure 2:
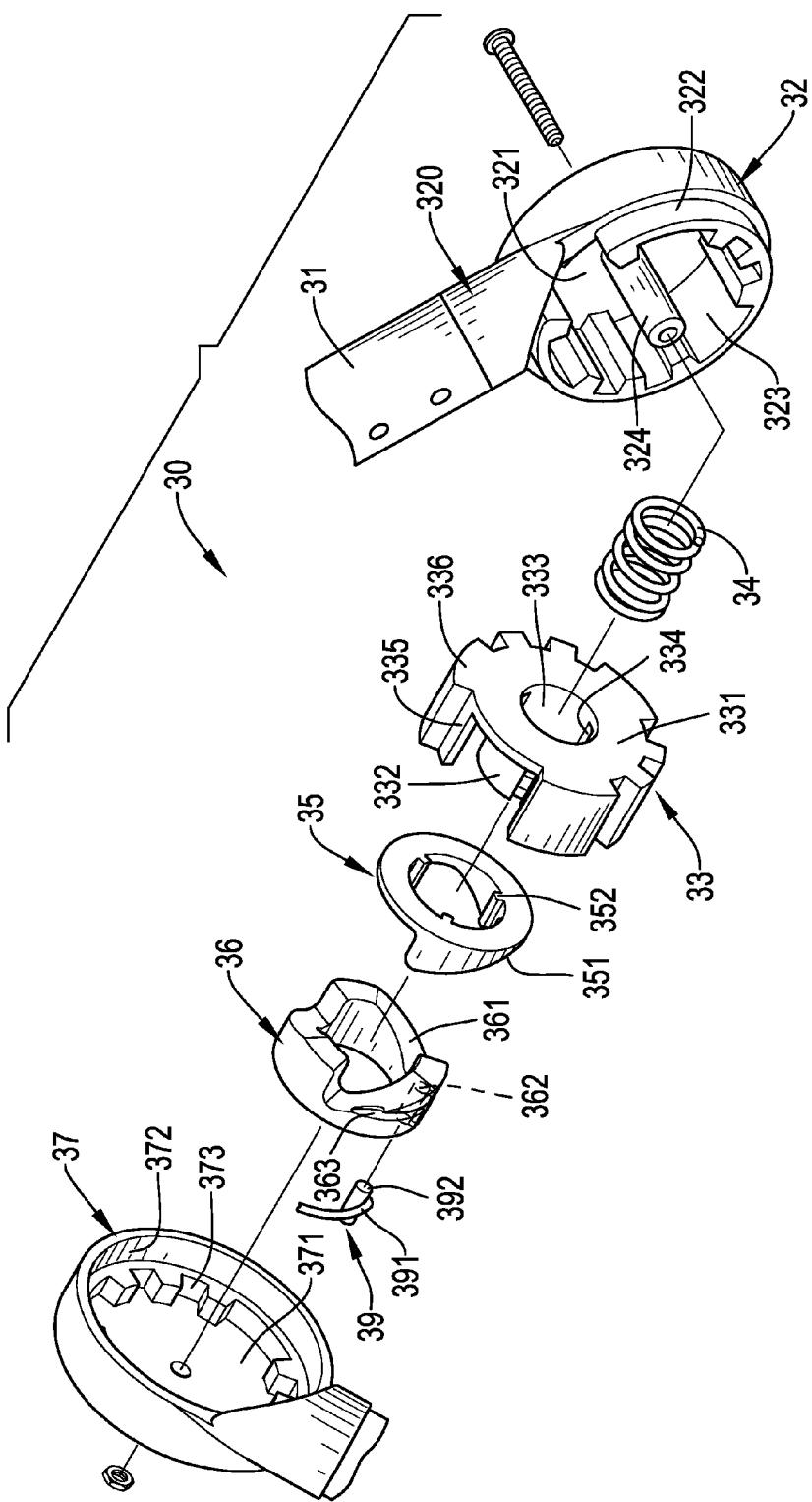
FIG. 2 is an enlarged exploded perspective view of the folding device in FIG. 1.
Figure 3:
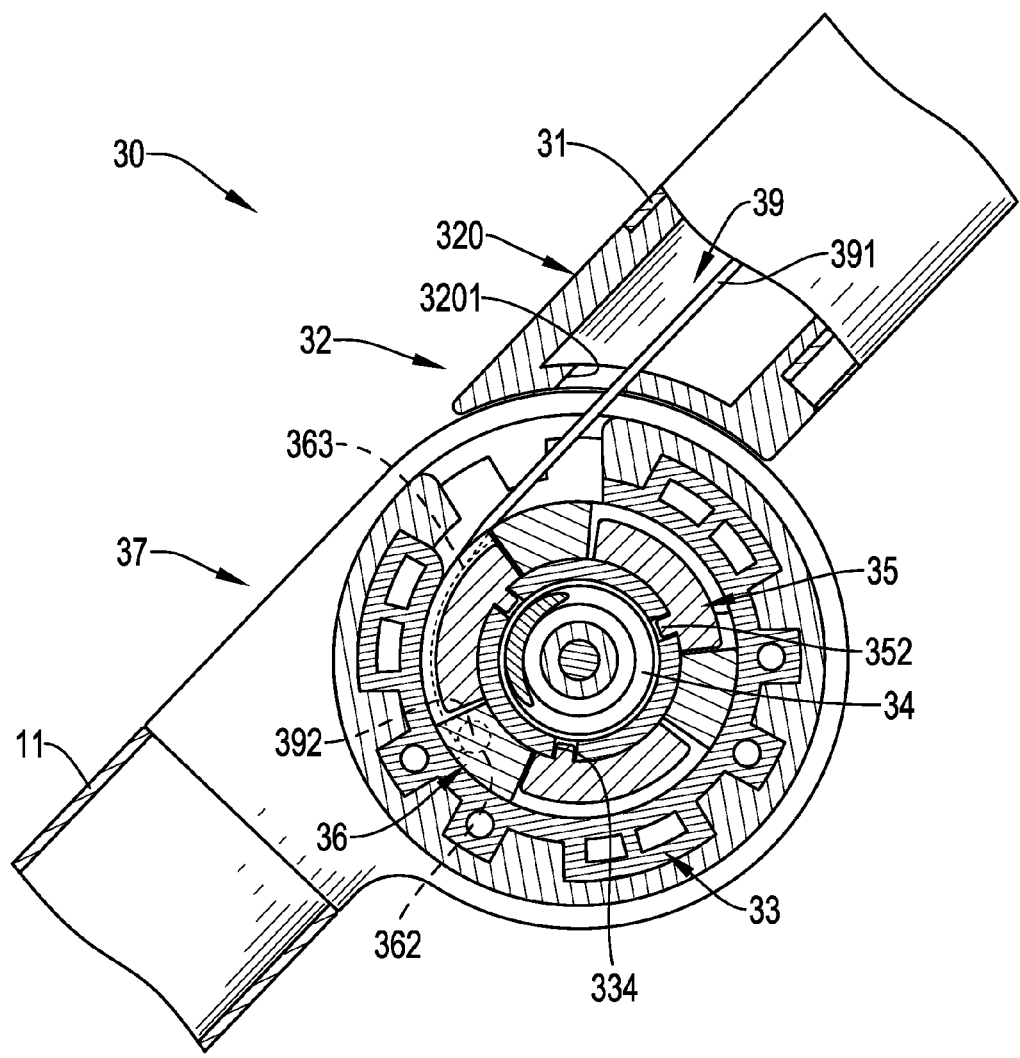
FIG. 3 is an enlarged side view in partial section of the folding device in FIG. 1.

With reference to FIGS. 1, 2, and 3, the engaging unit 33 is assembled in the first cover 32 and has a bottom plate 331, a mounting portion 332, a receiving hole 333, multiple slits 334, a peripheral wall 335, and an engaging segment 336. The bottom plate 331 has a central portion and a rim. The mounting portion 332 is a cylinder and has a peripheral surface and two opposite ends. One of the two opposite ends of the mounting portion 332 is connected to the central portion of the bottom plate 331. The receiving hole 333 is formed in the mounting portion 332 and extends from the central portion of the bottom plate 331 to the other end of the mounting portion 332. The multiple slits 334 are radially defined through the peripheral surface of the mounting portion 332, are arranged at angular intervals, and communicate with the receiving hole 333. The peripheral wall 335 is connected to the rim of the bottom plate 331 and has an outer surface. The engaging segment 336 is formed on the outer surface of the peripheral wall 335 and has multiple protrusions. The multiple protrusions of the engaging segment 336 are formed on the outer surface of the peripheral wall 335 and are arranged at angular intervals. The engaging segment 336 of the engaging unit 33 is engaged with the first engaging portion 323 of the first cover 32. The multiple protrusions of the engaging segment 336 are engaged in the angular intervals between the multiple protrusions of the first engaging portion 323. The elastic unit 34 is a compression spring and has two opposite ends. The elastic unit 34 is mounted around the positioning pole 324 of the first cover 32 and is received in the receiving hole 333 of the engaging unit 33. One of the two opposite ends of the elastic unit 34 abuts against the first plate 321 of the first cover 32. The other end of the elastic unit 34 abuts against the mounting portion 332 of the engaging unit 33.

With reference to FIGS. 1, 2, and 3, the first abutting unit 35 is mounted around the mounting portion 332 of the engaging unit 33 and is engaged with the engaging unit 33. The first abutting unit 35 is annular in cross section and has a first end, a second end, an inner surface, multiple first inclined protrusions, multiple first inclined faces 351, and multiple engaging protrusions 352. The first end of the first abutting unit 35 has a flat end face and abuts against the engaging unit 33. The second end of the first abutting unit 35 is opposite to the first end of the first abutting unit 35. The multiple first inclined protrusions are arranged at the second end of the first abutting unit 35 at angular intervals. The multiple first inclined faces 351 are respectively formed on the multiple first inclined protrusions. The multiple engaging protrusions 352 are formed on the inner surface of the first abutting unit 35 and are arranged at angular intervals. The multiple engaging protrusions 352 are respectively engaged with the multiple slits 334 of the engaging unit 33. Since the multiple engaging protrusions 352 are respectively engaged with the multiple slits 334 of the engaging unit 33, the first abutting unit 35 and the engaging unit 33 are unable to rotate relative to each other.

With reference to FIGS. 1, 2, and 3, the second abutting unit 36 is engaged with the first abutting unit 35. The second abutting unit 36 is annular in cross section and has a first end, a second end, an outer surface, multiple second inclined protrusions, multiple second inclined faces 361, a receiving recess 362, and a groove 363. The first end of the second abutting unit 36 has a flat end face. The second end and the first end of the second abutting unit 36 are opposite each other. The multiple second inclined protrusions are arranged at the second end of the second abutting unit 36 and are arranged at angular intervals. The multiple second inclined faces 361 are respectively formed on the multiple second inclined protrusions. The receiving recess 362 is formed in the outer surface of the second abutting unit 36 and extends from the first end toward the second end of the second abutting unit 36. The groove 363 is formed in the outer surface of the second abutting unit 36, is curved along the outer surface of the second abutting unit 36, and communicates with the receiving recess 362. The multiple second inclined faces 361 respectively abut against the multiple first inclined faces 351 of the first abutting unit 35.

With reference to FIGS. 1, 2, and 3, the second cover 37 is pivotally mounted on the first cover 32. The second cover 37 has a second plate 371, a second surrounding wall 372, a second engaging portion 373, and a connecting portion. The second plate 371 has a central portion and a rim. The second surrounding wall 372 is connected to the rim of the second plate 371 and has an inner surface and an outer surface opposite the inner surface of the second surrounding wall 372. The second engaging portion 373 is formed on the inner surface of the second surrounding wall 372 and has multiple protrusions. The multiple protrusions of the second engaging portion 373 are arranged at angular intervals. The multiple protrusions of the second engaging portion 373 are engaged in the angular intervals between the multiple protrusions of the engaging segment 336 of the engaging unit 33. The connecting portion of the second cover 37 is connected to the outer surface of the second surrounding wall 372 and is mounted to one of the two opposite ends of the connecting unit 11.

Figure 7:
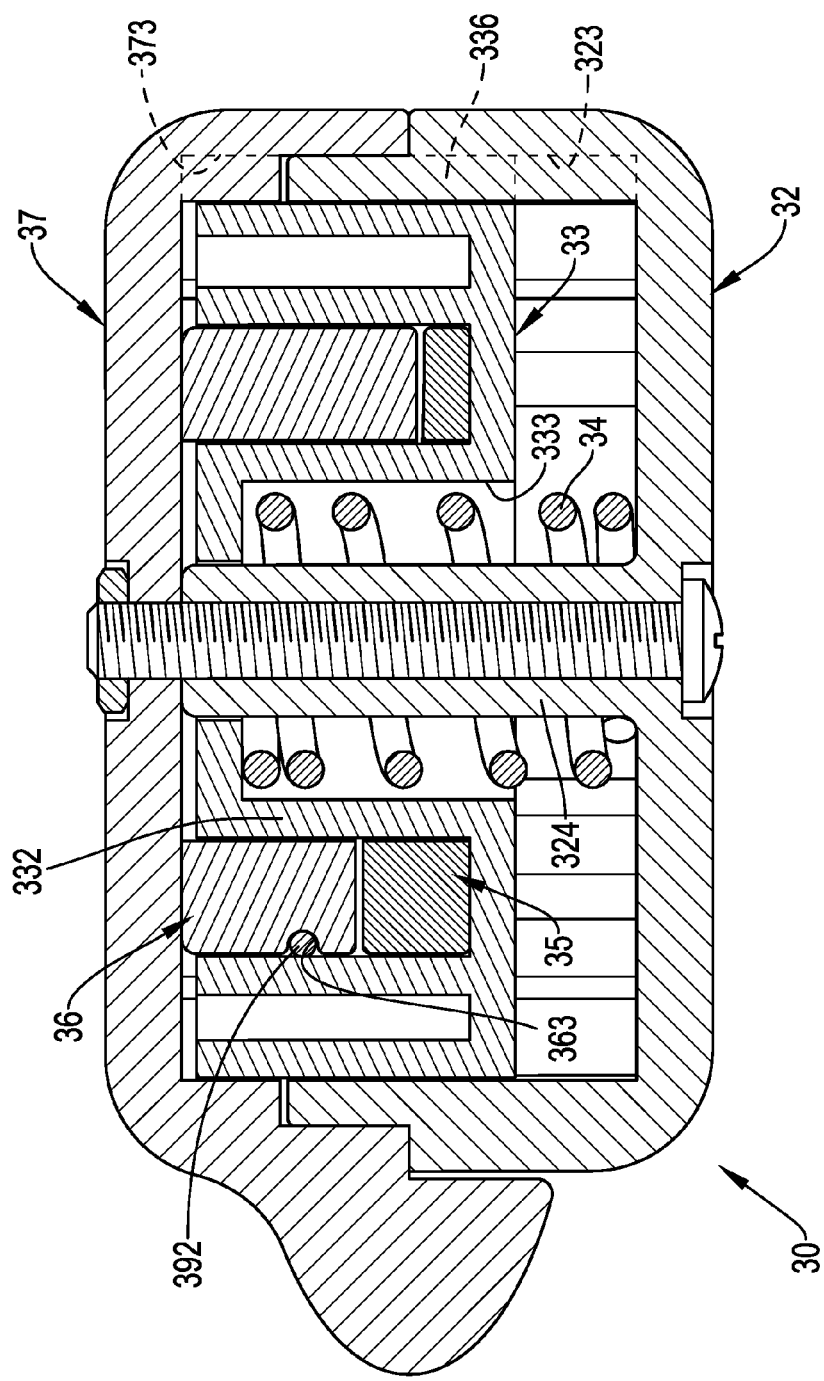
FIG. 7 is an enlarged operational side view in partial section along the line 7-7 in FIG. 1.
Figure 8:
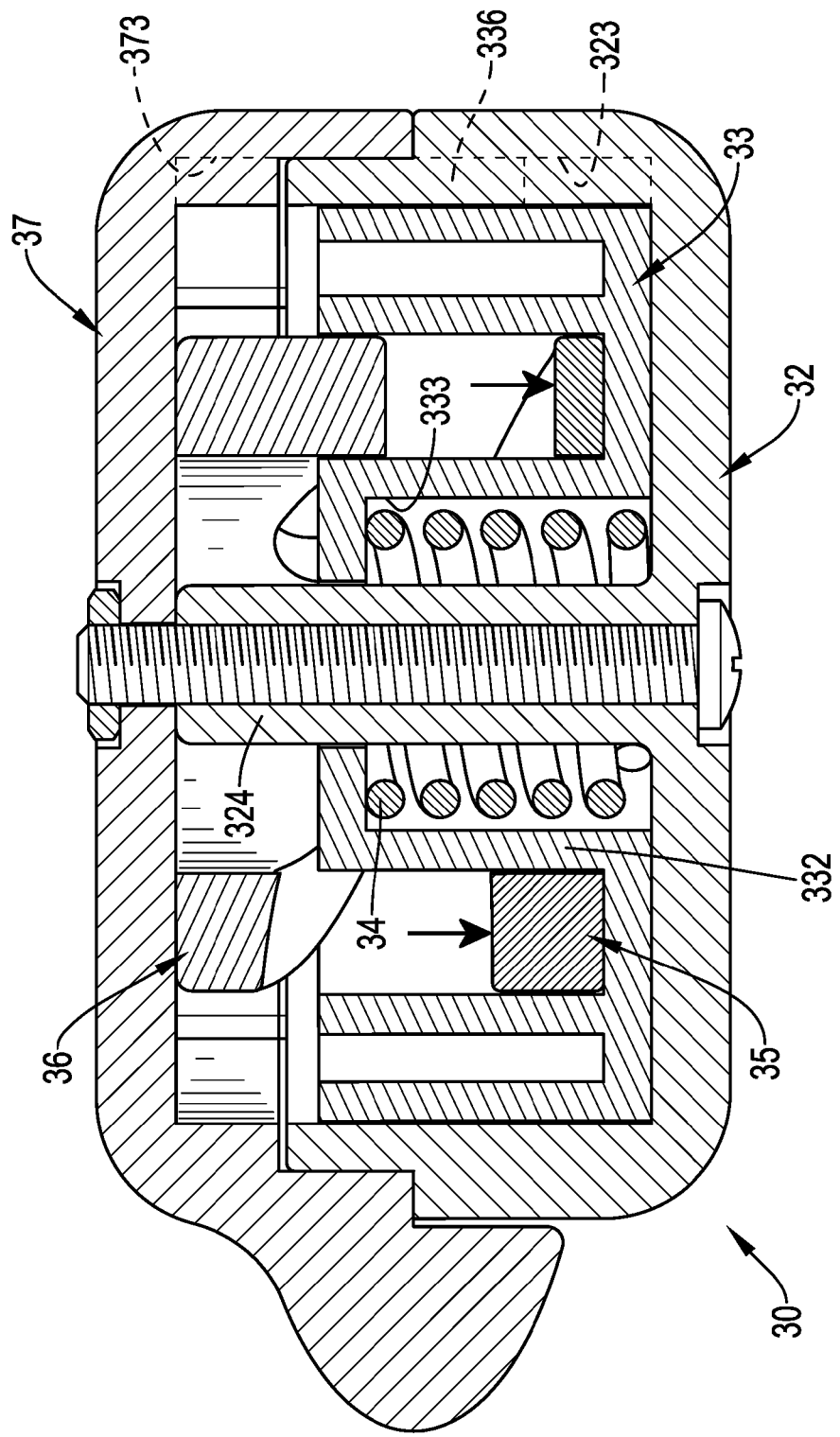
FIG. 8 is another enlarged operational side view in partial section of the folding device in FIG. 1.
Figure 9:
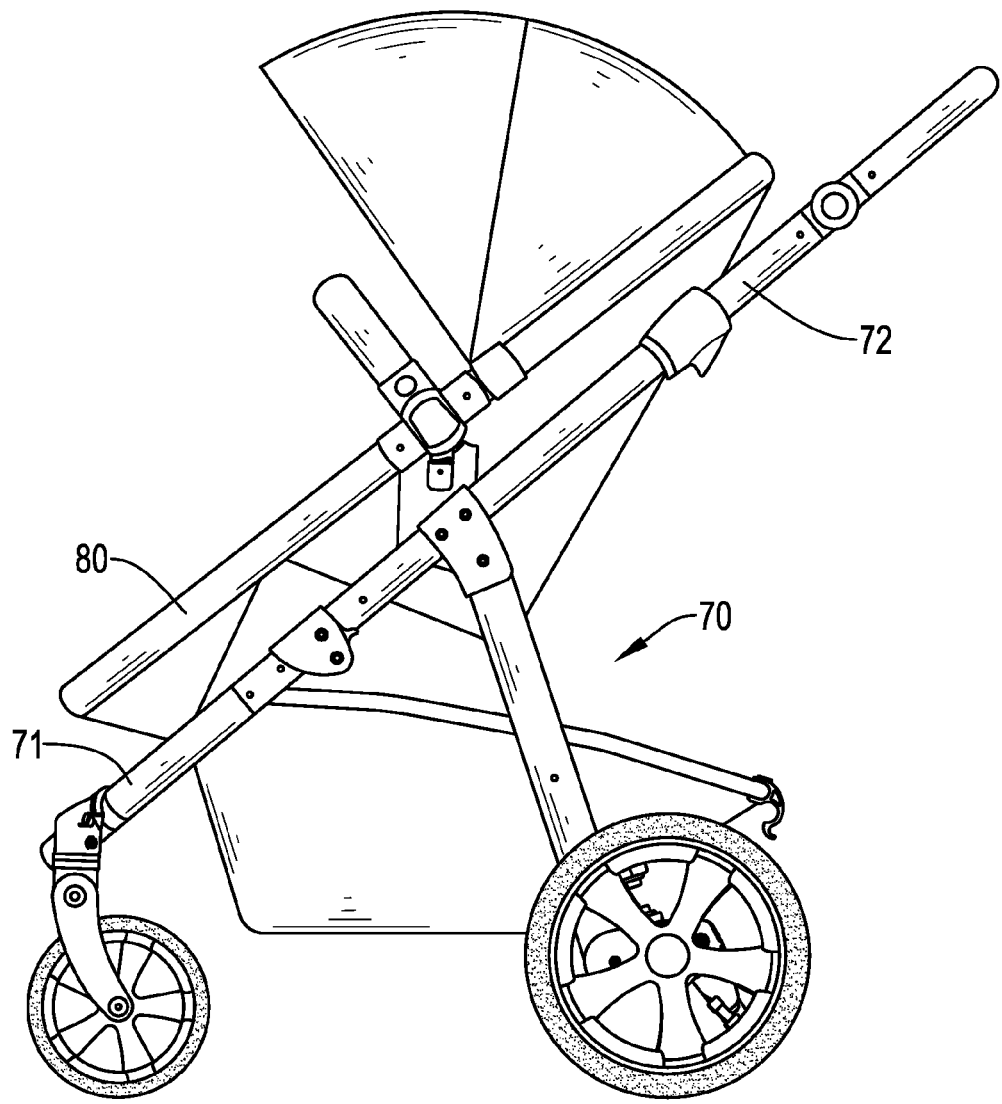
FIG. 9 is a side view of a conventional baby carriage.
Figure 10:
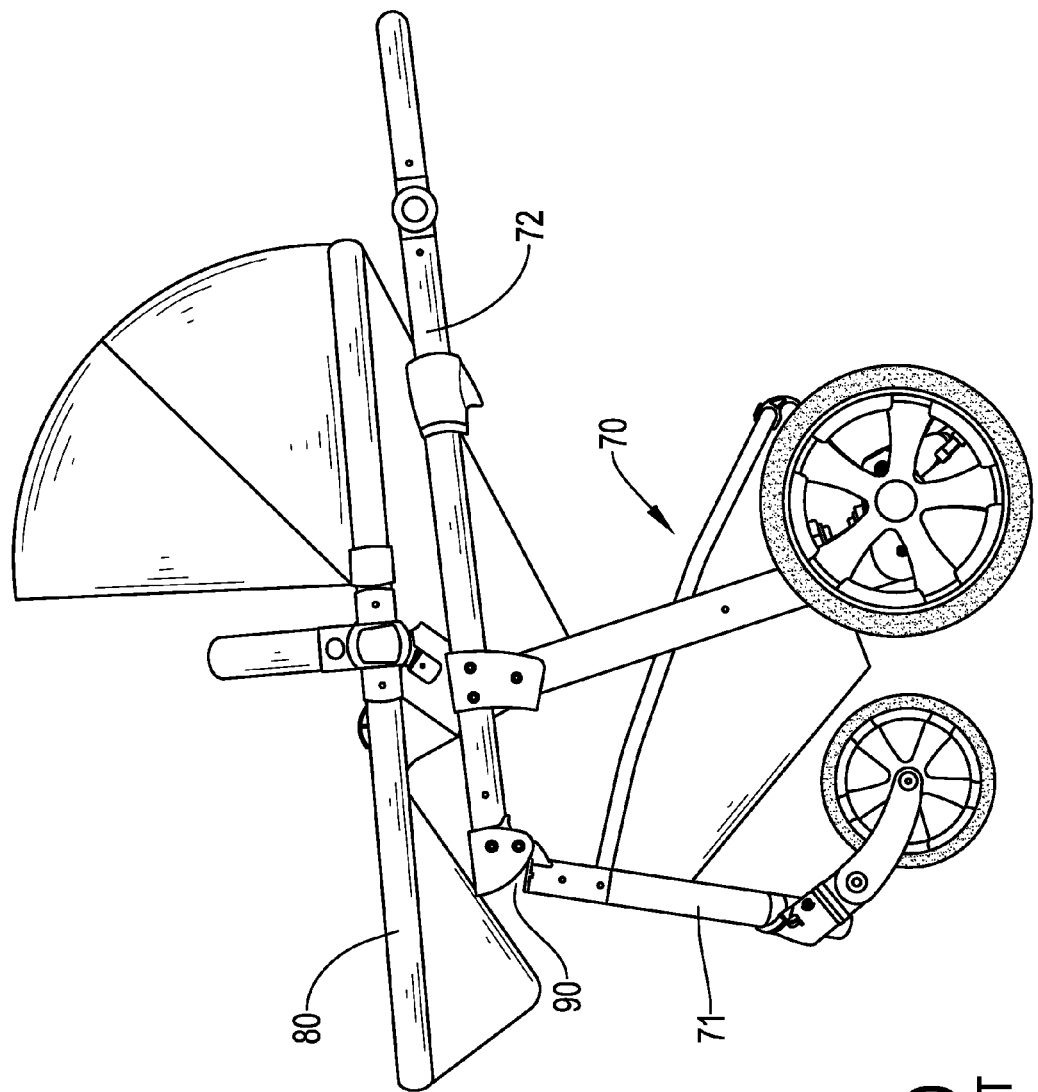
FIG. 10 is an operational side view of the conventional baby carriage in FIG. 9, shown being folded.

With reference to FIGS. 2, 7, and 8, the positioning pole 324 of the first cover 32 is mounted through the elastic unit 34, the engaging unit 33, the first abutting unit 35, and the second abutting unit 36. A pivoting unit is mounted through the positioning pole 324 to pivotally connect the first cover 32 with the second cover 37. The pivoting unit may be a bolt. The bolt is mounted through the positioning pole 324 and extends out of the second cover 37, and a nut is screwed with the bolt. Accordingly, the first cover 32 and the second cover 37 may be pivotally connected with each other. Alternatively, the first cover 32 and the second cover 37 may be pivotally connected with each other by riveting or other similar connecting methods. The second plate 371 of the second cover 37 abuts against the first end of the second abutting unit 36. The second engaging portion 373 of the second cover 37 is engaged with the engaging segment 336 of the engaging unit 33.

Figure 4:
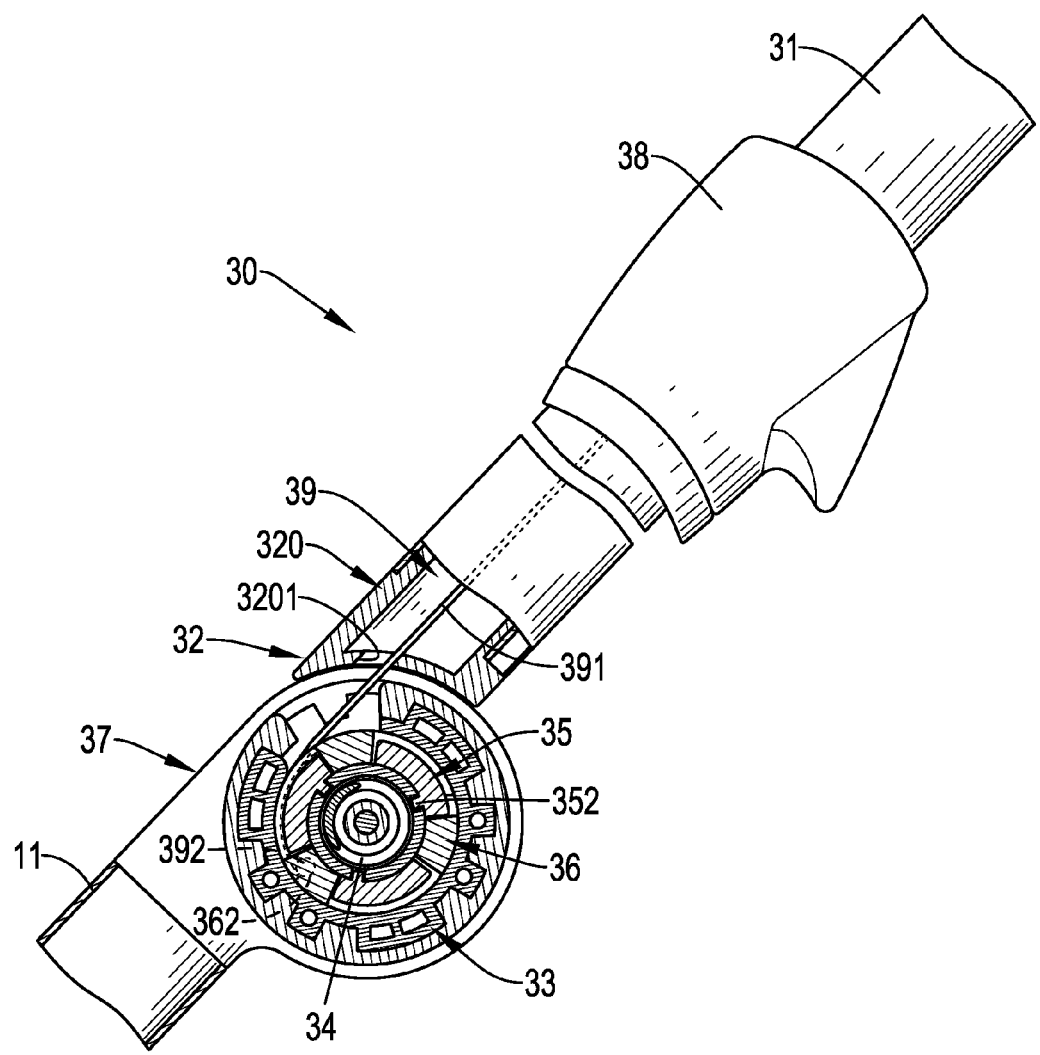
FIG. 4 is an enlarged operational side view in partial section of the folding device in FIG. 1.

With reference to FIGS. 1, 3, and 4, the operating sleeve 38 is hollow, is slidably mounted around the operating arm 31, and is distal from the first cover 32. The controlling cable 39 has a cord 391 and an engaging stick 392. The cord 391 is arranged inside the operating arm 31 and has two opposite ends. One of the two opposite ends of the cord 391 is connected to the operating sleeve 38. The other end of the cord 391 is mounted through the through hole 3201 of the connecting portion 320 and is connected to the engaging stick 392. The engaging stick 392 is engaged with the receiving recess 362 of the second abutting unit 36. A portion of the cord 391 is received in the groove 363 of the second abutting unit 36.

Figure 5:
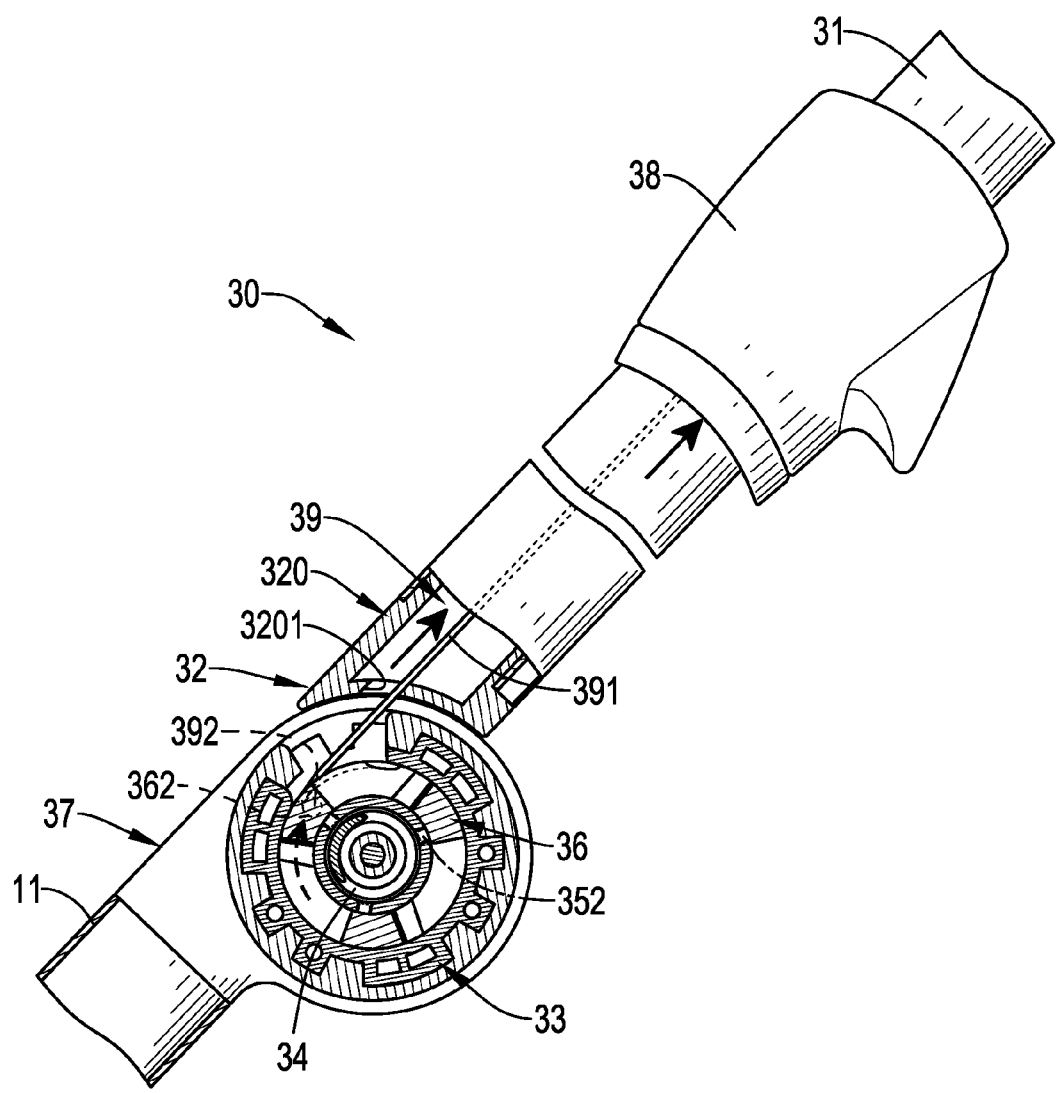
FIG. 5 is another enlarged operational side view in partial section of the folding device in FIG. 1.
Figure 6:
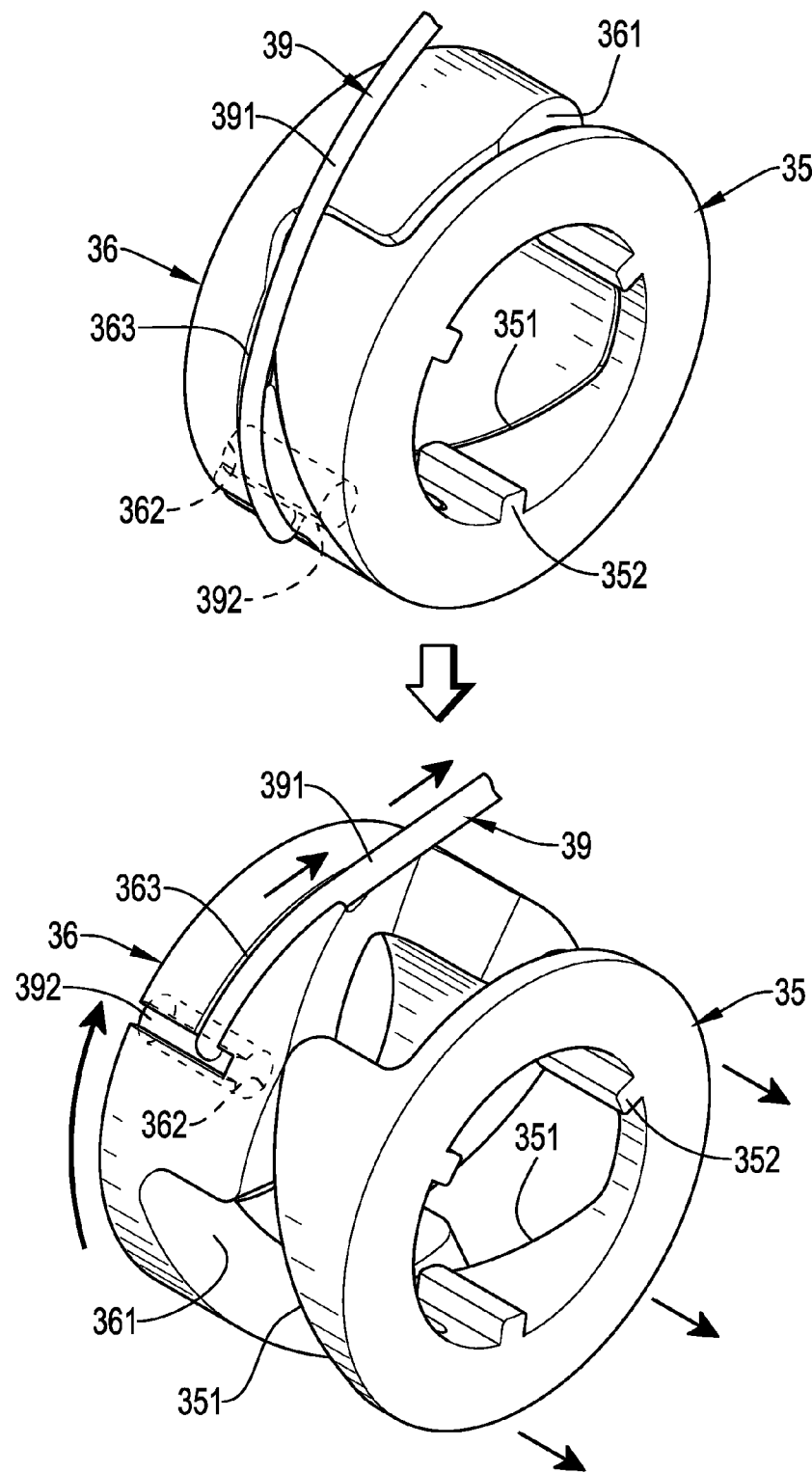
FIG. 6 shows enlarged operational perspective views of an inner structure of the folding device in FIG. 1.

With reference to FIGS. 4 and 7, as the first engaging portion 323, the second engaging portion 373, and the engaging segment 336 of the engaging unit 33 are engaged with each other, the first cover 32 is unable to rotate relative to the second cover 37. With reference to FIG. 5, when the operating sleeve 38 is pulled away from the first cover 32, the cord 391 of the controlling cable 39 pulls the engaging stick 392 connected to the cord 391. The engaging stick 392 is received in the receiving recess 362, is pulled by the cord 391, and makes the second abutting unit 36 rotate. With reference to FIGS. 6, 7, and 8, the first end of the second abutting unit 36 is abutted by the second plate 371 of the second cover 37, and the second inclined protrusions of the second abutting unit 36 and the first inclined protrusions of the first abutting unit 35 abut against each other. As the second abutting unit 36 and the first abutting unit 35 rotate mutually, the first abutting unit 35 and the second abutting unit 36 are detached from each other along the multiple first inclined faces 351 and the multiple second inclined faces 361. The engaging unit 33 is pushed by the first abutting unit 35 and moves towards the first cover 32, and the elastic unit 34 is pressed by the engaging unit 33. The engaging segment 336 of the engaging unit 33 detaches from the second engaging portion 373 of the second cover 37. Therefore, the first cover 32 is able to rotate relative to the second cover 37, and the handle 20 is able to rotate clock-wise to be folded. The engaging unit 33, the elastic unit 34, the first abutting unit 35, and the second abutting unit 36 are received inside the first cover 32 and the second cover 37, thereby not only avoiding dust and foreign objects interfering with operating of the folding device 30, but also preventing fingers from accidentally pinching.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A folding device comprising:
    an operating arm being a hollow tube and having two opposite ends;
    a first cover connected to one of the two opposite ends of the operating arm and having
        a first surrounding wall having an inner surface; and
        a first engaging portion formed on the inner surface of the first surrounding wall;
    an engaging unit assembled in the first cover and having
        a peripheral wall having an outer surface; and
        an engaging segment formed on the outer surface of the peripheral wall of the engaging unit and engaged with the first engaging portion;
    an elastic unit arranged between the first cover and the engaging unit and having two opposite ends, one of the two opposite ends of the elastic unit abutting against the first cover, the other end of the elastic unit abutting against the engaging unit;
    a first abutting unit abutting against the engaging unit, engaged with the engaging unit and being unrotatable relative to the engaging unit, the first abutting unit being annular in cross section and having multiple first inclined faces;
    a second abutting unit engaged with the first abutting unit, being annular in cross section, and having multiple second inclined faces respectively abutting against the multiple first inclined faces;
    a second cover connected with and being selectively pivotal relative to the first cover and having
        a second surrounding wall having an inner surface; and
        a second engaging portion formed on the inner surface of the second surrounding wall and engaged with the engaging segment of the engaging unit;
    an operating sleeve slidably mounted around the operating arm and being distal from the first cover; and
    a controlling cable having
        a cord arranged inside the operating arm and having two opposite ends, one of the two opposite ends of the cord connected to the operating sleeve and the other end of the cord connected to the second abutting unit.

2. The folding device as claimed in claim 1, wherein the first engaging portion of the first cover has multiple protrusions formed on the inner surface of the first surrounding wall and arranged at angular intervals;
the engaging segment of the engaging unit has multiple protrusions formed on the outer surface of the peripheral wall and arranged at angular intervals, and the multiple protrusions of the engaging segment are engaged in the angular intervals between the multiple protrusions of the first engaging portion; and
the second engaging portion of the second cover has multiple protrusions formed on the inner surface of the second surrounding wall and arranged at angular intervals, and the multiple protrusions of the second engaging portion are engaged in the angular intervals between the multiple protrusions of the engaging segment.

3. The folding device as claimed in claim 2, wherein the first cover has a first plate having a rim;
the first surrounding wall is connected to the rim of the first plate;
the engaging unit has
    a bottom plate having a central portion and a rim;
    a mounting portion being a cylinder and having two opposite ends, and one of the two opposite ends of the mounting portion is connected to the central portion of the bottom plate; and
    a receiving hole formed in the mounting portion and extending from the central portion of the bottom plate to the other end of the mounting portion;
the peripheral wall is connected to the rim of the bottom plate; and
the elastic unit is received in the receiving hole, and one of the two opposite ends of the elastic unit abuts against the first plate of the first cover, and the other end of the elastic unit abuts against the end of the mounting portion that is distal from the bottom plate.

4. The folding device as claimed in claim 3, wherein the mounting portion of the engaging unit has a peripheral surface;
the engaging unit has multiple slits radially defined through the peripheral surface of the mounting portion and communicating with the receiving hole;
the first abutting unit is mounted around the mounting portion and has an inner surface; and
    multiple engaging protrusions formed on the inner surface of the first abutting unit and respectively engaged with the multiple slits of the engaging unit.

5. The folding device as claimed in claim 4, wherein the second abutting unit has
    an outer surface;
    a receiving recess formed in the outer surface of the second abutting unit; and
    a groove formed in the outer surface of the second abutting unit and communicating with the receiving recess;
the controlling cable has an engaging stick, the engaging stick connected to the end of the cord that is distal from the operating sleeve and engaged with the receiving recess; and
the cord has a portion received in the groove.

6. The folding device as claimed in claim 5, wherein the first plate has a central portion;
the first cover has
    a positioning pole connected to the central portion of the first plate and mounted through the elastic unit, the engaging unit, the first abutting unit, and the second abutting unit; and
a pivoting unit is mounted through the positioning pole to pivotally connect the first cover with the second cover.

7. The folding device as claimed in claim 1, wherein the elastic unit is a compression spring.

8. The folding device as claimed in claim 2, wherein the elastic unit is a compression spring.

9. The folding device as claimed in claim 3, wherein the elastic unit is a compression spring.

10. The folding device as claimed in claim 4, wherein the elastic unit is a compression spring.

11. The folding device as claimed in claim 5, wherein the elastic unit is a compression spring.

12. The folding device as claimed in claim 6, wherein the elastic unit is a compression spring.

* * * * *